Patented Nov. 30, 1948

2,454,851

UNITED STATES PATENT OFFICE 2,454,851

INSULATING MATERIAL CONTAINING POLYSTYRENE AND PLASTICIZER AND METHOD OF MAKING

Arthur J. Warner, South Orange, N. J., and Myron Bakst, Alexandria, Va., assignors to Federal Telephone and Radio Corporation, New York, N. Y., a corporation of Delaware No Drawing. Application June 2, 1945, Serial No. 597,381

10 Claims. (Cl. 260—29.1)

This invention relates to novel compositions of matter and to methods for making the same. More particularly this invention relates to compositions of matter containing polymerized styrene as a component thereof. In one of its more specific aspects, the invention is directed to novel electrical insulating compositions or dielectrics and to methods for making them.

Polymerized styrene, or "polystyrene" as it is often called has excellent insulation and dielectric properties. To enable it to be readily used for insulation around conductors such as in cables and cable joints, it may be mixed with a suitable plasticizer, for example, polymerized alpha methyl styrene of low molecular weight which may suitably be around 200 to 500 so that when heated, the mixture is soft enough to flow into the place where it is wanted, and when cooled to ordinary temperatures, it hardens. A high molecular weight polystyrene, for example, about 80,000 molecular weight has heretofore been used for this purpose, as the high molecular weight form was heretofore found to be needed to avoid excessive brittleness at room temperature and excessive softness at elevated operating temperatures of around 85° C. As commonly practiced, a relatively large amount of plasticizer was needed for this, a ratio of polystyrene to plasticizer heretofore found satisfactory being about 55% plasticizer and only about 45% polystyrene, by weight.

The electrical insulating characteristics, such as power factor and dielectric constants of pure polystyrene are far superior to the corresponding characteristics of the plasticizers employed. Consequently, it is desirable to use as great a proportion as possible of polystyrene in admixture with a plasticizer in the provision of various compositions dependent upon the physical characteristics, such as extrusion and subsequent hardening characteristics, desired. In the course of our experimentations with polymerized styrene, we have discovered that novel compositions of matter, especially useful in the electrical art, may be produced by employing mixtures of polystyrene of different molecular weights together with one or a combination of two or more normally liquid plasticizers for the polystyrene of high molecular weight. By practicing this invention, we may produce various compositions which are relatively hard without being undesirably brittle at room temperature and soften very little at elevated operating temperatures when employed as electrical insulating materials, and which have good extrusion characteristics at elevated temperatures of around 120° C. so that they can be made initially to flow into position. Besides having these characteristics, these novel compositions may contain a high proportion of polystyrene and are especially useful as dielectric compositions.

In accordance with our invention, we increase the possible proportion of polystyrene to plasticizer by employing a mixture of some polymerized styrene of low molecular weight with the polymerized styrene of high molecular weight. Not only do these novel compositions have improved electrical properties, but they have better temperature/viscosity characteristics in that at temperatures approximating operating temperatures, they are more rigid than the corresponding all high molecular weight polystyrene whilst at higher temperatures such as 140° C. and over, they are more fluid, enabling the manufacturing processes to be carried out more easily. The high molecular weight normally solid polystyrene may have a molecular weight ranging from about 60,000 to 150,000 and preferably from about 80,000 to 120,000 and the low molecular weight normally solid polystyrene may have a molecular weight ranging from about 6,000 to 30,000 and preferably from about 6,000 to 20,000.

While a great variety of plasticizers may be employed, the plasticizers found particularly suitable are stable homocyclic carbon compounds having two or three fused rings that have a boiling point higher than 240° C., that possess a low electric moment and are capable of swelling polystyrene. By a stable compound is meant a compound that does not alter its composition on exposure to the air and/or on being subjected to temperatures up to 150° C. By a compound that possesses a low electric moment is meant a compound that either does not have any polar groups or has polar groups arranged symmetrically or has a single chloro, carboxylic, carboxylic ester, or etheric group containing not more than five carbon atoms. By a compound capable of swelling polystyrene is meant an aromatic compound not possessing oxide, hydroxyl, or keto groups, and also either without side chains or having only side chains containing not more than five carbon atoms. Examples of such compounds are isoamylnaphthalene, phenanthrene, dihydro methylabietate, A-propylnaphthalene, B-methylnaphthalene, fluorene, B-naphthylmethylether, B-naphthylethylether, and a mixture of octahydroanthracene and octahydrophenanthrene.

As will be indicated by the examples which follow fifty to seventy per cent by weight of the compositions of this invention may consist of high molecular weight polymerized styrene; eighteen to thirty per cent by weight of the compositions may consist of low molecular weight polymerized styrene; and ten to twenty per cent by weight of the compositions may consist of a plasticizer.

A satisfactory method for preparing our novel composition and recited herein for the purpose of illustration is to mix a quantity of the desired low molecular weight polystyrene with a quantity of plasticizer. The mix is agitated and preferably heated at about 60° C. until a substantially uniform solution is produced. The temperature of this solution is increased to about 140° C. to 150° C. in an internal mixer and then the desired quantity of high molecular weight polymer is slowly added thereto, preferably in powdered state. During this addition, the mass is continuously agitated and maintained within this temperature range until the high molecular weight polymer is substantially completely dissolved therein. The resultant mass may then be poured into pans and cooled to room temperature and at this temperature is substantially solid. In the course of the mixing and heating operations, I prefer that the mass be maintained in an inert atmosphere or under high vacuum conditions. This particular manner of combining the high molecular weight and the low molecular weight polymers of styrene with plasticizer to provide these novel compositions need not be employed, because various other methods will suggest themselves to those skilled in the art.

The compositions of this invention have the advantage of having a relatively high proportion of the desired polystyrene therein and may contain as much as 80% of it, while still having the required good extrusion characteristic at around 100° C. In prior art compositions, it was not practical to use as much as 80% of the desired polystyrene in the mixture, for if the ordinary high molecular weight polystyrene had been used with only 20% of plasticizer, great difficulty would be experienced in obtaining a uniform, void-free product and furthermore this product would be difficultly extrudable at the desired extrusion temperature of 120° C. If, on the other hand, low molecular weight polystyrene had been used alone as an extrusion composition, its properties would have been even more undesirable because then the resultant substance would be so brittle at room temperature as to fracture if subjected to a sharp blow, and so soft as to flow at the elevated operating temperatures of around 85° C. at which electrical cable often operates. The mixture of the high molecular weight plasticized polystyrene with the low molecular weight polymerized styrene according to our invention, however, flows and extrudes just as well at high temperatures of around 120° C., does not become brittle at room temperature, and yet softens less at 85° C. than when the polystyrene in the mixture is of all high molecular weight. This is an extremely desirable characteristic because the material, whilst extruding readily at the convenient temperature of 120° C., is sufficiently rigid under the operating conditions for the electrical conductor to be kept in position without adverse deformation.

For a fuller understanding of the invention, reference is invited to the following examples which are given by way of illustration and not limitation; all parts being given by weight unless otherwise specifically indicated.

*Example 1*

About 25 parts of powdered polystyrene having a molecular weight of 6,000 to 30,000, is mixed with 15 parts of isoamylnaphthalene. This mixture is agitated by means of a pitched paddle and heated to about 60° C. and maintained in this condition of agitation and at said elevated temperature until a substantially uniform solution is produced. Then the temperature of the solution is increased to about 140° C. to 150° C. and there is slowly added thereto 60 parts of powdered polystyrene having a molecular weight of 60,000 to 150,000. During this addition, the mass is continuously agitated and maintained within this temperature range until the high molecular weight polymer is substantially completely dissolved therein. Then the resultant mass may be poured into pans and cooled to room temperature, and at this temperature is substantially solid.

*Example 2*

About 18 parts of powdered polystyrene having a molecular weight of 6,000 to 30,000, is mixed with 18 parts of phenanthrene. This mixture is agitated by means of a pitched paddle and heated to about 60° C. and maintained in this condition of agitation and at said elevated temperature until a substantially uniform solution is produced. Then the temperature of the solution is increased to about 140° C. to 150° C. and there is slowly added thereto 66 parts of powdered polystyrene having a molecular weight of 60,000 to 150,000. During this addition, the mass is continuously agitated and maintained within this temperature range until the high molecular weight polymer is substantially completely dissolved therein. Then the resultant mass may be poured into pans and cooled to room temperature, and at this temperature is substantially solid.

*Example 3*

About 20 parts of powdered polystyrene having a molecular weight of 6,000 to 30,000 is mixed with 10 parts of octahydrophenanthrene. This mixture is agitated by means of a pitched paddle and heated to about 60° C. and maintained in this condition of agitation and at said elevated temperature until a substantially uniform solution is produced. Then the temperature of the solution is increased to about 140° C. to 150° C. and there is slowly added thereto 70 parts of powdered polystyrene having a molecular weight of 60,000 to 150,000. During this addition, the mass is continuously agitated and maintained within this temperature range until the high molecular weight polymer is substantially completely dissolved therein. Then the resultant mass may be poured into pans and cooled to room temperature, and at this temperature is substantially solid.

*Example 4*

About 30 parts of powdered polystyrene having a molecular weight of 6,000 to 30,000 is mixed with 20 parts of A-propylnaphthalene. This mixture is agitated by means of a pitched paddle and heated to about 60° C. and maintained in this condition of agitation and at said elevated temperature until a substantially uniform solution is produced. Then the temperature of the solution is increased to about 140° C. to 150° C. and there is slowly added thereto 50 parts of powdered polystyrene having a molecular weight of 60,000 to 150,000. During this addition, the mass is continuously agitated and maintained within this temperature range until the high molecular weight polymer is substantially completely dissolved therein. Then the resultant mass may be poured into pans and cooled to room temperature, and at this temperature is substantially solid.

Since certain changes in carrying out the above process and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

This is a continuation-in-part of our co-pending application, Ser. No. 456,056, filed on August 25, 1942, now abandoned.

We claim:

1. An insulating substance comprising about 50% of polymerized styrene having a molecular weight within the range of about 80,000 to 120,000, about 30% of polymerized styrene having a molecular weight in the range of about 6,000 to 20,000, and about 20% of plasticizer, by weight.

2. An insulating substance comprising about 50% of polymerized styrene having a molecular weight within the range of about 80,000 to 120,000, about 30% of polymerized styrene having a molecular weight in the range of about 6,000 to 20,000, and about 20% of a substance which is a stable homocyclic carbon compound having at least two and not exceeding three fused rings, that has a boiling point higher than 240° C., that possess a low electric moment and is capable of swelling polymerized styrene.

3. The method of making plasticized polymerized styrene which comprises mixing polymerized styrene having a molecular weight within the range of about 6,000 to 20,000 with a plasticizer, then raising the temperature to around 140° C. to 150° C. and adding polystyrene having a molecular weight within the range of about 80,000 to 120,000 while mixing.

4. The method of making plasticized polymerized styrene which comprises mixing a polymerized styrene with a molecular weight within the range of about 6,000 to 20,000 in a plasticizer which is a stable homocyclic carbon compound having at least two and not exceeding three fused rings that has a boiling point higher than 240° C., that possess a low electric moment and is capable of swelling polymerized styrene, then raising the temperature to about 140° C. to 150° C. and adding polymerized styrene having a molecular weight in the range of about 80,000 to 120,000 in such amounts that the proportions by weight are in the order of 30% of low molecular weight polymerized styrene, 50% of high molecular weight polymerized styrene, and 20% plasticized, by weight.

5. A composition of matter comprising high molecular weight polymerized styrene, low molecular weight polymerized styrene, and a plasticizer; the molecular weight of the high molecular weight polymerized styrene being in the range of about 60,000 to 150,000; the molecular weight of the low molecular weight polymerized styrene being in the range of about 6,000 to 30,000; and the ingredients being present in proportions falling within the following approximate ranges, by weight per cent of the total composition:

| | |
|---|---|
| High molecular weight polymerized styrene | 50 to 70 |
| Low molecular weight polymerized styrene | 18 to 30 |
| Plasticizer | 10 to 20 |

6. A composition of matter comprising high molecular weight polymerized styrene, low molecular weight polymerized styrene, and a plasticizer; the molecular weight of the high molecular weight polymerized styrene being about 80,000; the molecular weight of the low molecular weight polymerized styrene being in the range of about 6,000 to 30,000; and the ingredients being present in proportions falling within the following approximate ranges, by weight per cent of the total composition:

| | |
|---|---|
| High molecular weight polymerized styrene | 50 to 70 |
| Low molecular weight polymerized styrene | 18 to 30 |
| Plasticizer | 10 to 20 |

7. A composition of matter comprising high molecular weight polymerized styrene, low molecular weight polymerized styrene, and a plasticizer; the molecular weight of the high molecular weight polymerized styrene being in the range of approximately 80,000 to 120,000; the molecular weight of the low molecular weight polymerized styrene being in the range of approximately 6,000 to 20,000; and the ingredients being present in proportions falling within the following approximate ranges, by weight per cent of the total composition:

| | |
|---|---|
| High molecular weight polymerized styrene | 50 to 70 |
| Low molecular weight polymerized styrene | 18 to 30 |
| Plasticizer | 10 to 20 |

8. A composition of matter comprising high molecular weight polymerized styrene, low molecular weight polymerized styrene, and a plasticizer; which is a stable homocyclic carbon compound having at least two and not exceeding three fused rings that has a boiling point higher than 240° C., that possesses a low electric moment and is capable of swelling polymerized styrene; the molecular weight of the high molecular weight polymerized styrene being in the range of about 60,000 to 150,000; the molecular weight of the low molecular weight polymerized styrene being in the range of about 6,000 to 30,000; and the ingredients being present in proportions falling within the following approximate ranges, by weight per cent of the total composition:

| | |
|---|---|
| High molecular weight polymerized styrene | 50 to 70 |
| Low molecular weight polymerized styrene | 18 to 30 |
| Plasticizer | 10 to 20 |

9. A method of making plasticized polymerized styrene from high molecular weight polymerized styrene, low molecular weight polymerized styrene, and a plasticizer; the molecular weight of the high molecular weight polymerized styrene being in the range of about 60,000 to 150,000; the molecular weight of the low molecular weight polymerized styrene being in the range of about 6,000 to 30,000; and the ingredients being present in proportions falling within the following approximate ranges, by weight per cent of the total composition:

High molecular weight polymerized styrene _____ 50 to 70
Low molecular weight polymerized styrene _____ 18 to 30
Plasticizer _____ 10 to 20 which method comprises mixing the low molecular weight polymerized styrene with the plasticizer, raising the temperature of the mixture to around 140° C. to 150° C. and incorporating the high molecular weight polymerized styrene into the mixture at that temperature.

10. A method of making plasticized polymerized styrene from high molecular weight polymerized styrene, low molecular weight polymerized styrene, and a plasticizer; the molecular weight of the high molecular weight polymerized styrene being in the range of about 60,000 to 150,000; the molecular weight of the low molecular weight polymerized styrene being in the range of about 6,000 to 30,000; and the ingredients being present in proportions falling within the following approximate ranges, by weight per cent of the total composition:

High molecular weight polymerized styrene _____ 50 to 70
Low molecular weight polymerized styrene _____ 18 to 30
Plasticizer _____ 10 to 20 which method comprises forming a substantially uniform mixture of the low molecular weight polymerized styrene and plasticizer by heating these substances together at about 60° C. with agitation, then increasing the temperature of the mixture to about 140° C. to 150° C. and slowly adding the high molecular weight polymerized styrene thereto with continuous agitation while maintaining the temperature at about 140° C. to 150° C. until a substantially uniform solution is obtained, and thereafter cooling the solution thus obtained to room temperature.

ARTHUR J. WARNER.
MYRON BAKST.

REFERENCES CITED

The following references are of record in the file of this patent:

UNITED STATES PATENTS

| Number | Name | Date |
|---|---|---|
| 2,272,996 | Warner | Feb. 10, 1942 |